March 24, 1959 — R. L. BRATTRUD — 2,878,860
SEAT CONSTRUCTION

Filed April 1, 1957 — 2 Sheets-Sheet 1

INVENTOR.
ROBERT L. BRATTRUD,
BY
*Flanward Flam*
ATTORNEYS.

March 24, 1959   R. L. BRATTRUD   2,878,860
SEAT CONSTRUCTION
Filed April 1, 1957   2 Sheets-Sheet 2
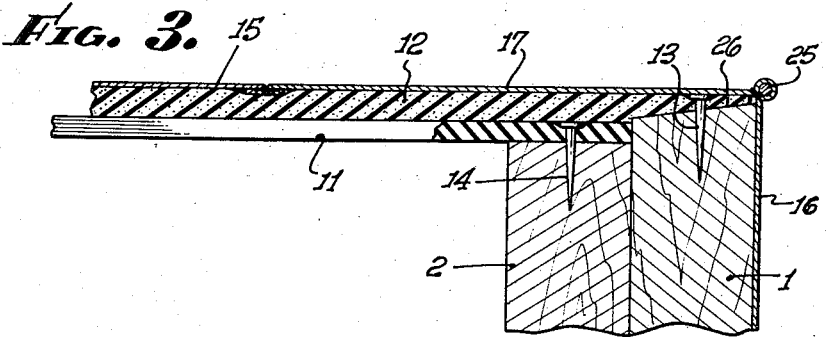
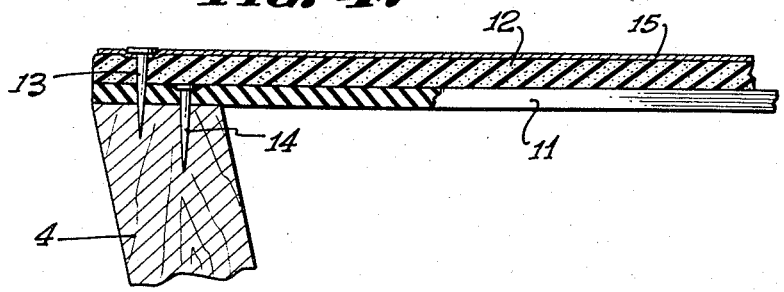
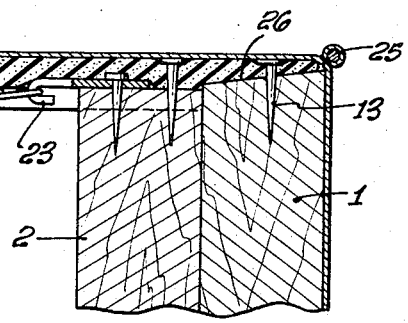
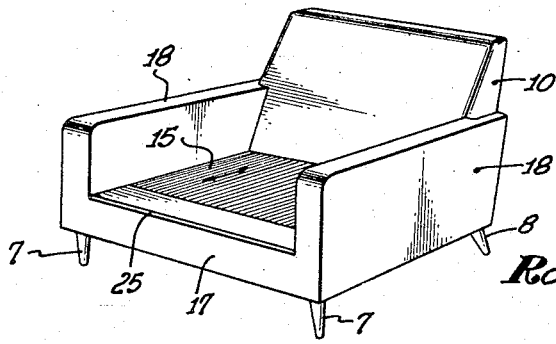
INVENTOR.
Robert L. Brattrud,
BY
*Flam and Flam*
ATTORNEYS.

United States Patent Office 2,878,860
Patented Mar. 24, 1959

2,878,860
SEAT CONSTRUCTION
Robert L. Brattrud, Lomita, Calif.
Application April 1, 1957, Serial No. 649,915
2 Claims. (Cl. 155—178)

This invention relates to upholstered furniture, and particularly to those items of furniture that are provided with seats, such as chairs, davenports, settees, lounges, daybeds, couches, sectional davenports, etc.

In such structures, it has been common to provide loose cushions. These cushions may be made soft and resilient by proper choice of fillings, such as foam rubber, down, coiled springs, or the like. It has also been common to provide webbing of stout material for providing an adequate support for the cushions. In order to enhance the yielding qualities of the seat, such webbing may take the form of rubber strips. When the cushion is placed over such rubber webbing, the webbing acts as a spring support.

In the common use of stout fabric webbing, no problem is encountered in appropriately concealing the webbing from view when the cushions are lifted. Any appropriate fabric can be utilized, serving as a base upon which the cushion rests.

When rubber webbing is used, such attempts to conceal it result in reducing the effectiveness of the webbing, for fabric if neatly stretched across the seat, prevents full loading of the webbing. This occurs because such fabric does not materially stretch, and will by itself support the load imposed on the cushion, without the help of the webbing.

It is one of the objects of this invention to make full use of the resilience of the webbing, and yet to make it possible to conceal this webbing.

It is another object of this invention to improve in general seat structures utilizing elastic webbings.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 1:
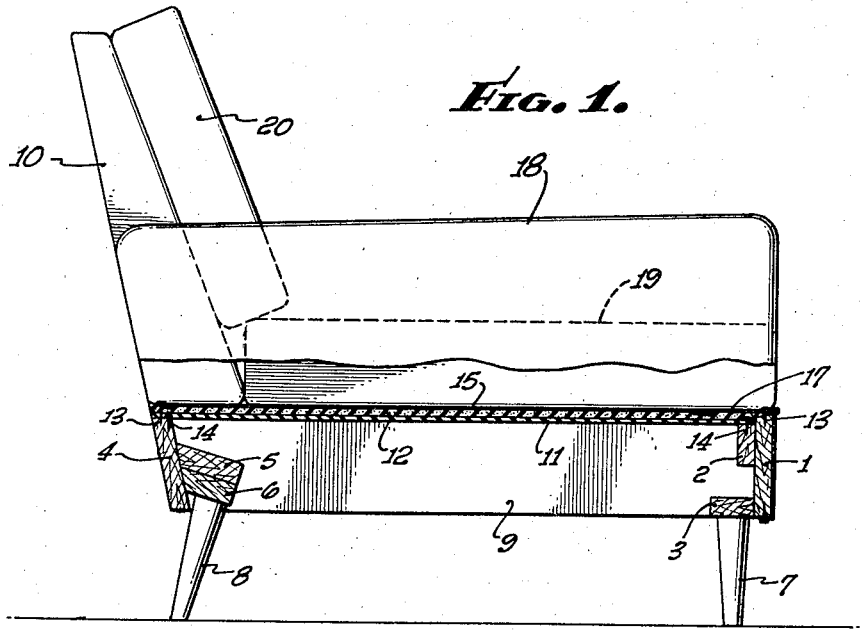
Figure 1 is a side elevation of a chair incorporating the invention.
Figure 2:
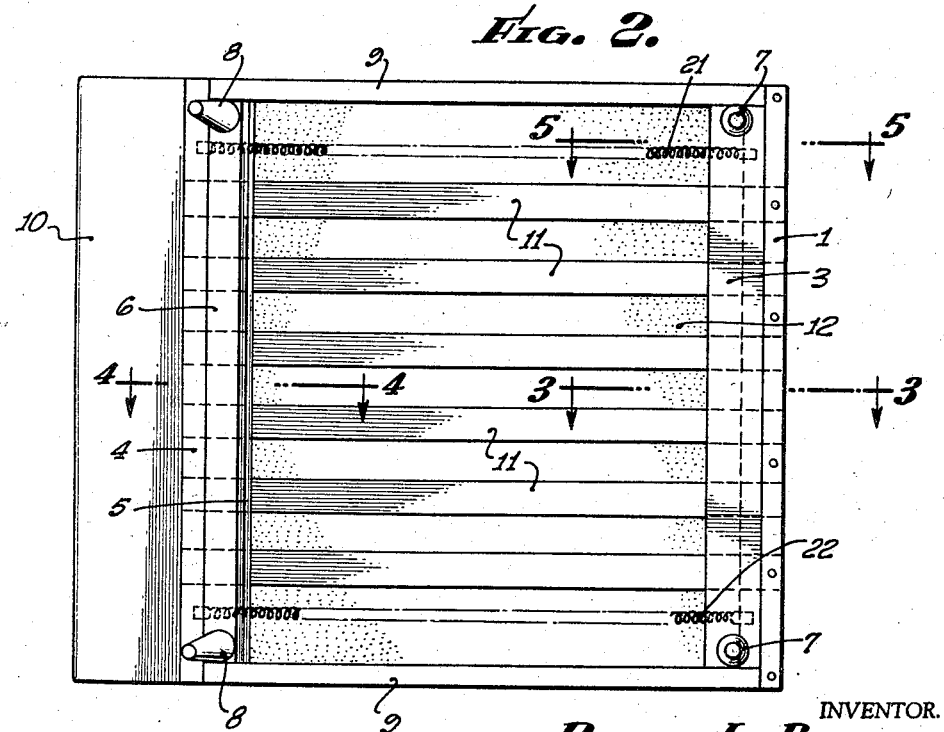
Fig. 2 is a bottom view thereof.

Figs. 3, 4 and 5 are enlarged sectional views, taken along planes corresponding to lines 3—3, 4—4 and 5—5, respectively of Fig. 2; and Fig. 6 is a perspective view of a chair incorporating the invention, but without the loose cushions.

Any conventional type of framing for the chair may be used. In the present instance, there are wood frame members 1, 2 and 3 at the front edge of the seat. Frame members 4, 5 and 6 extend adjacent the rear edge. Two of the frame members are appropriately attached to the leg structures 7 and 8. There are side frame members 9 attached to the frame members 1 and 4.

Appropriate structures are provided for forming a back portion 10 and the arms 18. Since the specific details of the chair are unimportant, and since the invention may be incorporated in other types of seats, further description of the framing of the articles of furniture involved is not necessary.

The frame elements 2 and 4 at the top edge support a plurality of stout rubber webbing elements or straps 11. In the present instance, these rubber elements are shown as extending over the top of front member 2 and attached thereto as by tacks 14. At their opposite ends, the straps extend over the top of frame member 4. The top 26 of frame member 1 slopes downwardly toward the top of element 2. Of course, any other desired arrangement of this webbing may be utilized.

Disposed on top of the rubber webbing 11 is a foam plastic sheet 12. This sheet covers the entire frame. It is attached as by short tacks 13 to the top of the frame. The sheet 12 may be quite thin, and serves the purpose of providing a smooth yielding layer entirely covering the webbing 11.

In order to cover the sheet 12, use is made of a fabric 15 tacked to the frame elements 4 and 9 and extending almost to the front edge of the frame (see Fig. 3). This fabric 15 is smoothly stretched; it has threads possessing elastic quality. For example, such fabric may be the familiar one or two-way stretch fabric utilized in women's undergarments. In the present instance, the elastic threads run from front to back of the chair structure. At its front edge 16 (Fig. 3), it is joined as by a seam to a fabric cover member 17 joined to a welt 25 and thence extending downwardly along the width of the frame member 1 and covering it.

The fabric 15, together with cover 17 is stretched so that the right-hand edge of sheet 12 is compressed against the sloping upper face 26 of frame member 1. The fabric 15 thus conceals the webbing construction and yet permits the transmission of the load to the webbing. Furthermore, it is always neatly stretched and presents a finished appearance.

A seat cushion 19 rests loosely upon the fabric member 15. A back cushion 20 may also be provided. Both of these cushions may be in the form of a slab of foam rubber appropriately covered with any desired fabric.

In use, the cushion 19 is compressed and transmits its load through the fabric 15 and sheet 12 to the webbing 11. This webbing flexes under the load, and resiliently supports the user. The fabric 15 is stretched by the load to the extent permitted by the relatively little stretching of the stout webbing 11.

In order to prevent undue sagging at the side edges of the seat, a pair of metal supports 21 and 22 extend in a parallel direction to the webbing 11, and adjacent these edges. These supports 21 and 22 may be in the form of a flattened coiled wire. Anchors 23 (Fig. 5) for the ends of these elements are mounted on top of the frame members 2 and 4.

The inventor claims:

1. In upholstered furniture structure: a rigid frame defining an opening generally corresponding to a seat area; webbing made of elastic material and in the form of straps extending across the opening and in substantial spaced parallel side-by-side relationship with respect to each other; fastening means for securing the ends of the straps to the frame; a removable cushion supported by the straps; and means transferring to the straps the load imposed upon the cushion while providing finished upholstery to the entire seat portion, comprising fabric means covering the entire seat area having a first portion extending downwardly along the frame at the front of the seat area, and a second portion having elastic threads, the second portion being disposed so as to be beneath the cushion and above the straps, said second portion being smoothly stretched to overlie the straps, thereby covering the seat opening; the fabric means being secured adjacent its edges to the frame whereby the elastic threads permit elastic elongation of said second portion in a direction having a substantial component parallel to said straps and cause said second portion to yieldingly conform to changing contours of the straps under varying loads imposed upon the cushion.

2. The combination as set forth in claim 1, with the addition of a sheet of yielding flexible padding material disposed across the opening and over the straps and substantially entirely covering the opening, and being interposed between the straps and the fabric means; and fastening means for securing the marginal portions of the flexible padding material to the frame.

References Cited in the file of this patent

FOREIGN PATENTS

| 181,942 | Austria | Oct. 15, 1954 |
| 720,696 | Great Britain | Dec. 22, 1954 |
| 1,027,344 | France | Feb. 11, 1953 |